Feb. 21, 1950   J. G. ARNOLD ET AL   2,497,853
APPARATUS FOR PROJECTING CIRCULAR MARKINGS
UPON NONPLANAR SURFACES
Filed June 12, 1944   3 Sheets-Sheet 1
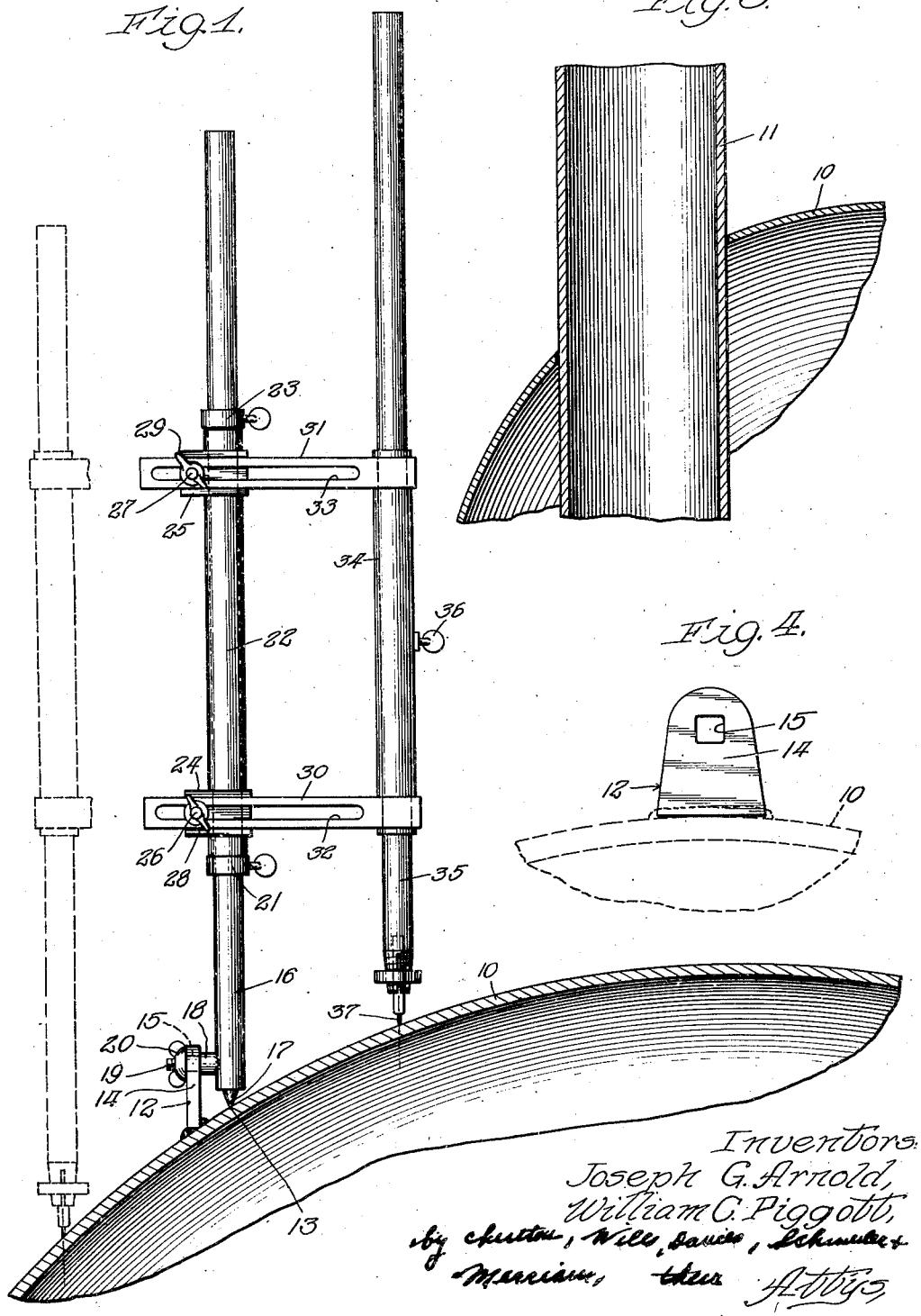
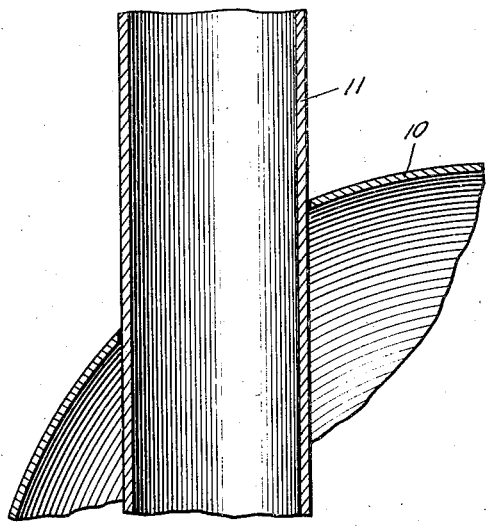
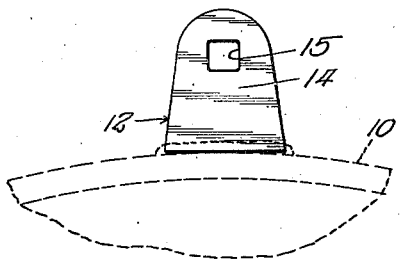
Inventors:
Joseph G. Arnold,
William C. Piggott,

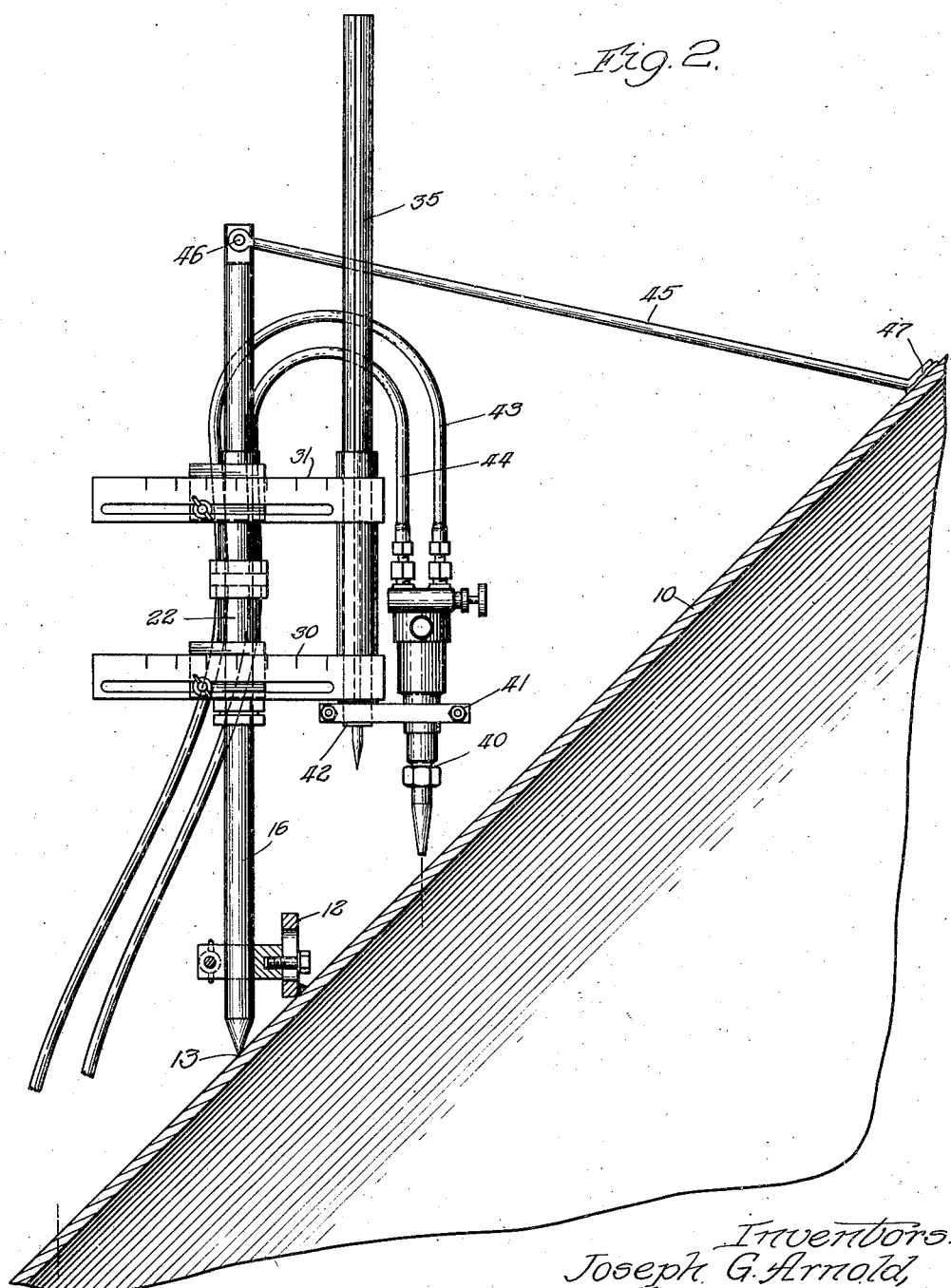

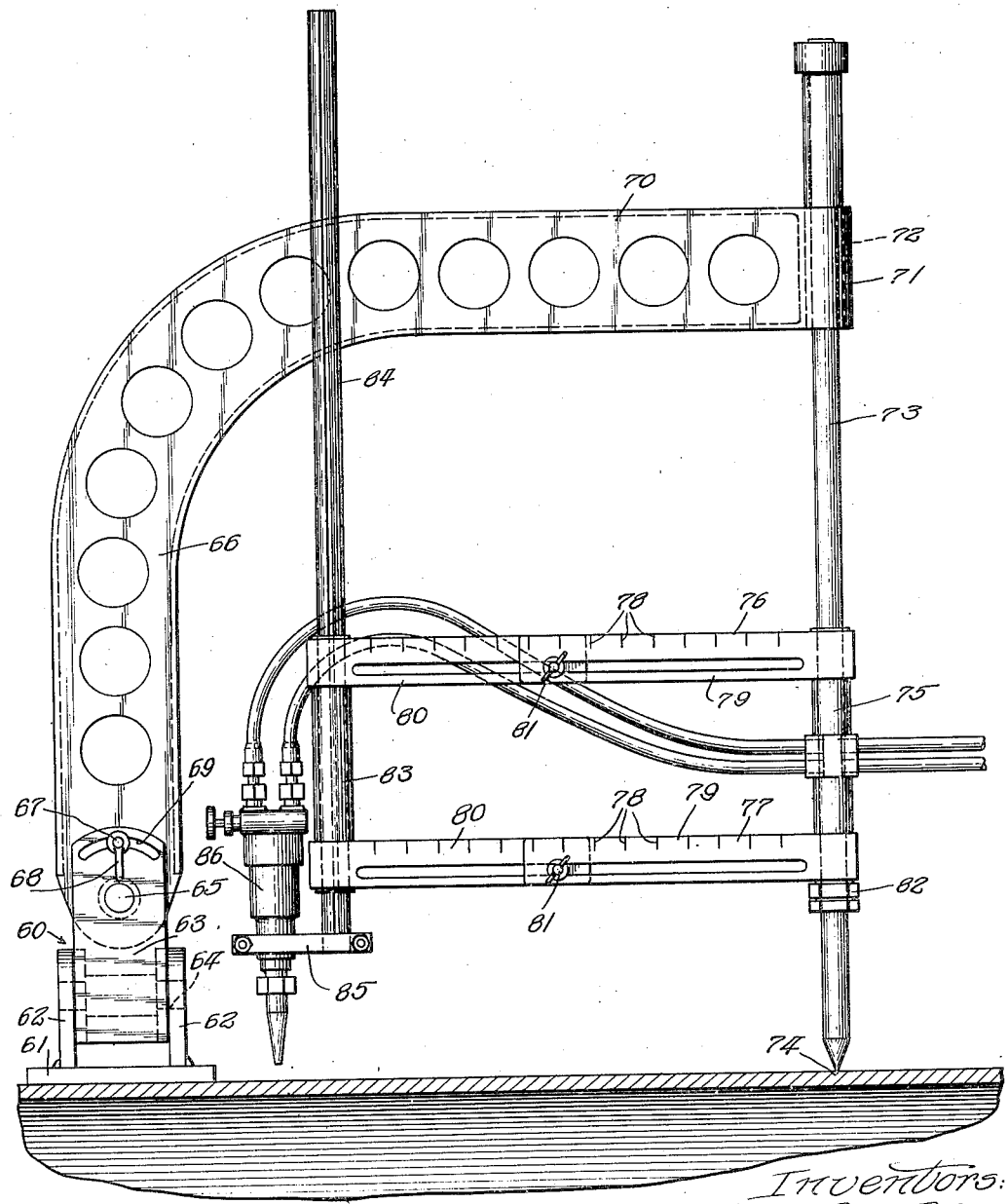

Patented Feb. 21, 1950

2,497,853

UNITED STATES PATENT OFFICE 2,497,853

APPARATUS FOR PROJECTING CIRCULAR MARKINGS UPON NONPLANAR SURFACES

Joseph G. Arnold, Chicago, Ill., and William C. Piggott, Port Arthur, Tex., assignors to Chicago Bridge & Iron Company, a corporation of Illinois Application June 12, 1944, Serial No. 539,980

1 Claim. (Cl. 33—21)

This invention relates to a method of projecting circular markings upon inclined or multiplanar surfaces, such, for example, as spheroids, for the purpose of forming an opening adapted to fit cylindrical pipes and the like.

The invention is particularly applicable to the manufacture of steel tanks having spheroidal, conical, or other multiplanar surfaces. In the past whenever it was necessary to fit a pipe into such a surface, the projection of the circular pipe upon the irregular work surface was made by trial and error or by rough approximation. The result was that fittings were not exact. The invention may also be applied to flat surfaces where the pipe is to be at an angle thereto.

We have discovered that accurate positioning and location of such openings may readily be made on multiplanar surfaces by affixing a control arm to the work surface at the point where the axis of the fitting cylinder impinges upon the surface and in the same position that the axis of the cylinder is to occupy. A marking arm is held in spaced radial relationship to the control arm by at least one spacing member which is slidably mounted. The marking arm is then rotated while in marking contact with the work surface. Since it is held in fixed radial relationship to the control arm but is free to move inwardly and outwardly along, or with respect to, the control arm, it will mark the proper projection of a circle upon the work surface.

The invention is illustrated in the drawings in which Figure 1 is a plan view of one form of the apparatus in position upon a work surface; Figure 2 is a similar view of a modified form of the device; Figure 3 is a view of a work surface with the pipe fitted in the opening produced by the present invention; Figure 4 is a side view of the lug; and Figure 5 is a view of a modified form of the invention.

As shown in the drawings, the work surface 10, which may be a spheroidal segment of a sheet metal tank, is to be provided with an opening for a pipe 11 in the angular position shown in Figure 3. In order to produce this opening a lug 12 is welded to the work surface near the point 13 at which the axis of the pipe 11 impinges upon it. The lug 12 may suitably be of the form shown in Figure 4 consisting of an upstanding metal web 14 having a lock opening 15. The control arm 16 is preferably pointed, as at 17, and the point is placed at the point 13 and the arm itself is held in the same angular relationship to the work surface that the pipe 11 is to occupy. A stud 18 is provided on the control arm having a threaded neck 19 which fits within the lock opening 15. A wing nut 20 is provided for locking the control arm in position.

A movable ring clamp 21 is provided on the control arm as a stop. Beyond it is a slidable tube 22 fitting loosely upon the arm and held upon the arm by a stop 23. The tube 22 carries plates 24 and 25 having threaded studs 26 and 27 carrying the wing nuts 28 and 29. Adjustable spacing members or radius arms 30 and 31 having slots 32 and 33 are positioned upon the studs 26 and 27 and also secured to a tube 34 within which the marking arm 35 is slidably mounted. A set screw 36 is provided in the tube 34 for fixing the arm in a predetermined position if desired. It is obvious that the radius arms and the marking arm may be consolidated as a unit, provided that the assembly is slidable on the control arm, but in that case the end of the marking arm, including the marker, should be parallel to the control arm for accuracy.

The marking arm is shown in Figure 1 as provided with a marker 37 which may preferably be a piece of soapstone. This is held in position by any suitable means.

In carrying out the operation the lug 12 is secured to the work surface, and the control arm is then fixed in axial alignment with the axis to be occupied by the pipe. It is preferred that the point 17 of the control arm be positioned directly upon the work surface. The control arm may be axially aligned with that of the pipe without contacting the work surface and even without any direct attachment thereto, but this involves difficulty such that it is preferred to attach the arm directly to the work surface. The spacing members 30 and 31 are then adjusted to the proper radius. The marking arm is then rotated with the marker in marking contact with the work surface. Inasmuch as the marking arm may slide within the tube 34, it will mark a projection of a circle upon the work surface. The same result may be obtained by fixing the marking arm in the tube 34 and sliding the tube 22 on the control arm. This, however, is generally less suitable because of the added mechanism which must be moved. With the marking arm free to move in the tube 34, the only inertia to be overcome is that of the arm itself. If the marking arm is slidable with respect to the radius arms, it should be parallel to the control arm.

In Figure 2 we have shown another form of the invention in which the marking device is a blowtorch 40. In this case the flame from the torch is directed axially of the marking arm so that the distance of the torch itself from the work is unimportant. The arm is rotated in marking contact with the work surface—i. e., with the flame from the torch bearing upon the work surface. The torch may be used to mark or to cut the work. Other cutting means may be substituted if desired.

The blowtorch is carried in a yoke 41 detachably secured to the lower end 42 of the marking arm 35. The hoses 43 and 44 of the blowtorch are looped and secured to the tube 22. In view of the weight of the blowtorch, we have indicated a support 45 secured to the outer end 46 of the control arm and to the work surface at 47.

In Figure 5 we have shown a modified form of the device in which a universal mounting 60 is provided which may be welded or secured either to the work surface or elsewhere. This mounting includes a base 61 having a pair of upright arms 62 in which the yoke 63 is rotatably mounted as, for example, upon the pin 64. In the upper part of the yoke is a pin 65 upon which is mounted the curved arm 66. The movement of this arm is limited by the pin 67 provided with the wing nut 68. This pin is positioned in the slot 69 in the yoke 63. The arm 66 has a lateral extension 70 having a length more than half that of the largest opening which it is proposed to make. In the end of the extension is a circular enlargement 71 having a central opening 72 through which the control arm 73 is passed. The point 74 of the control arm is set at the predetermined position on the work surface.

A sleeve 75 carries the radius arms 76 and 77 which are suitably calibrated as indicated at 78 to indicate the measured radius. Each of these arms is made up of a pair of bars 79 and 80, telescoping within 79 or being otherwise suitably carried thereby. A set screw 81 may be provided for locking them in position. The motion of the sleeve 75 on the control arm 73 is suitably limited by the adjustable stop 82.

The radius arms terminate in a sleeve 83 within which the marking arm 84 is positioned. To the lower portion of this arm is secured a bar 85 to which the blowtorch 86 is fastened.

The foregoing detailed description has been given for clearness of understanding only, and no unnecessary limitations should be understood therefrom.

What we claim as new, and desire to secure by Letters Patent, is:

Apparatus for determining an opening in a work surface in the shape of a non-circular projection of a predetermined circle comprising: a control arm, means secured to said control arm adapted to be welded to said work surface for rigidly securing the control arm to the surface in a predetermined angular position over a point on said surface at the center of said circle, a marking arm, a first tubular member slidably and rotatably mounted on said control arm, stop means on said control arm to limit the slidable movement of said member, a second tubular member slidably mounted on said marking arm and rotatable relative thereto, a pair of adjustable arms secured to said members for radially spacing the marking arm varying predetermined distances from the control arm whereby said marking arm is rotatable about said control arm and is slidable in said second tubular member in a direction axially of said control arm while in marking contact with said surface.

JOSEPH G. ARNOLD.
WILLIAM C. PIGGOTT.

REFERENCES CITED

The following references are of record in the file of this patent:

UNITED STATES PATENTS

| Number | Name | Date |
| --- | --- | --- |
| 1,286,770 | Rashkovsky | Dec. 3, 1918 |
| 1,991,117 | Porteous et al. | Feb. 12, 1935 |
| 2,142,436 | Clabeaux | Jan. 3, 1939 |

FOREIGN PATENTS

| Number | Country | Date |
| --- | --- | --- |
| 545,026 | Germany | Feb. 25, 1932 |